No. 784,005. PATENTED FEB. 28, 1905.
E. C. KETCHUM.
APPARATUS FOR UTILIZING SOLAR HEAT.
APPLICATION FILED MAY 21, 1902.
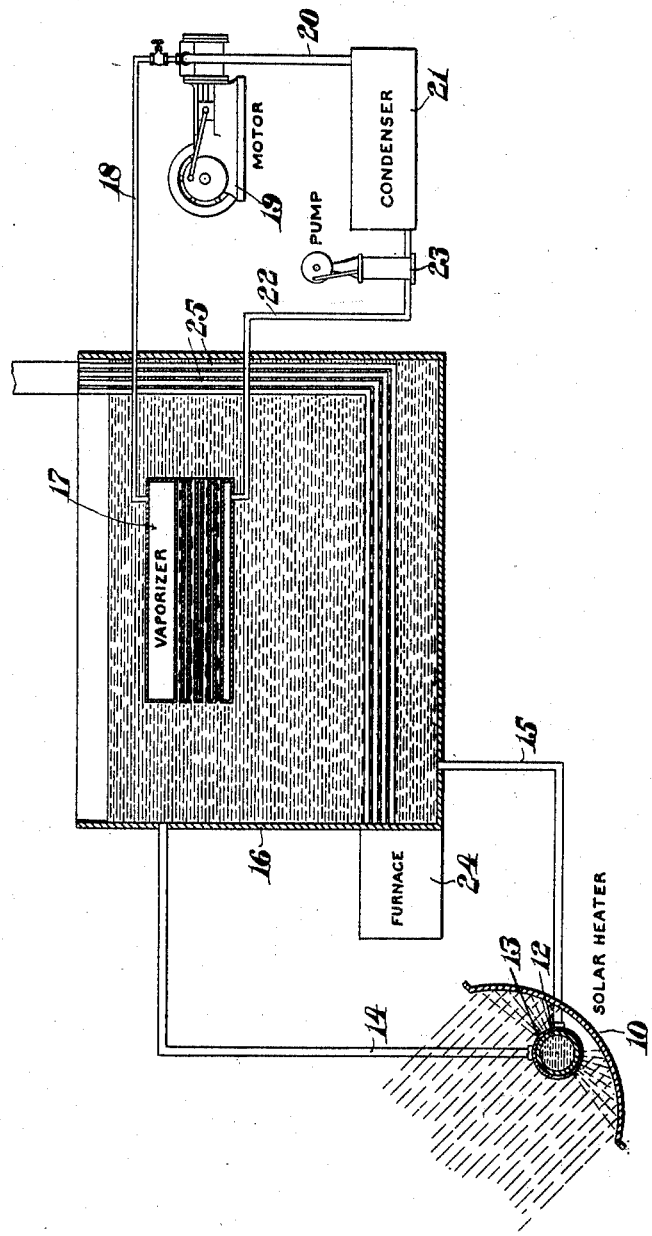
Witnesses:
Edwin T Luce
Margaret Harrison
Inventor:
Ernest C. Ketchum,
by Lombard & Cobb
Attys.

No. 784,005.

Patented February 28, 1905.

UNITED STATES PATENT OFFICE.

ERNEST C. KETCHUM, OF BOSTON, MASSACHUSETTS, ASSIGNOR TO THE SOLAR POWER COMPANY, OF BOSTON, MASSACHUSETTS.

APPARATUS FOR UTILIZING SOLAR HEAT.

SPECIFICATION forming part of Letters Patent No. 784,005, dated February 28, 1905.

Application filed May 21, 1902. Serial No. 108,367.

*To all whom it may concern:*

Be it known that I, ERNEST C. KETCHUM, a citizen of the United States of America, and a resident of Boston, in the county of Suffolk and State of Massachusetts, have invented certain new and useful Improvements in Apparatus for Storing and Utilizing Solar Heat, of which the following is a specification.

My invention relates to the storing and utilizing of the heat energy of the sun's rays, and more particularly to its conversion into mechanical power, said invention consisting in the combinations hereinafter described and more particularly claimed.

In the accompanying drawing, which represents a diagrammatic view of one form of my apparatus, the numeral 10 designates a concentrating device for the heat-rays, preferably consisting of a trough-shaped parabolic mirror, which may be of any suitable reflecting substance, as polished metal or silvered glass. At the focus of the mirror is situated a receptacle, which may consist of a metal pipe 12, extending longitudinally of the mirror and covered, if desired, with a glass casing 13 transparent to the sun's rays, but opaque to non-luminous heat. The mirror is rotated about its focus at an angular velocity coinciding with the apparent motion of the sun, and both mirror and reservoir may be also moved to correspond with the declination of the sun, these movements being effected by hand or by any convenient mechanism, as clockwork. The receptacle is connected by pipes or conduits 14 15, constituting the flow and return, respectively, with a comparatively large reservoir or tank 16, this connecting system being supplied with some liquid, conveniently water, which may contain in solution some such substance as an alkali for the purpose of raising the boiling-point. The reservoir may be built of any suitable material—as stone, wood, or metal—insulated, if necessary, to prevent loss of heat by radiation, or it may be located in an excavation in the ground lined with cement or other impervious non-conducting material. In any case in may be covered, if desired, to prevent loss by radiation and evaporation. In a position to be under the influence of the heat given out by the liquid in the reservoir, preferably within and near the top thereof, is the comparatively small vaporizer or receptacle 17 of any suitable form and material, conveniently of steel or iron pipe, which is adapted to contain a suitable quantity of such a volatile fluid as ether or sulfur dioxid, the boiling-point of which is sufficiently less than that of the water or solution in the circulating system to generate vapor having a convenient pressure at the temperature of moderately hot water. From the vaporizer a pipe or conduit 18 delivers to a motor 19 of any desired type. From the motor a pipe or conduit 20 leads the exhaust to a condenser 21, from which products of condensation may be forced through a pipe or conduit 22 by means of a pump 23 back into the vaporizer, these connecting elements forming a continuous circuit.

The operation of the apparatus is as follows: The solar rays falling upon the concentrating device are focused upon the receptacle and heats the liquid therein, causing a continuous circulation through the flow-pipe, reservoir, and return-pipe, thus heating the entire body of liquid, the conditions being such that a temperature below its boiling-point is preferably maintained. This heat will be communicated to the volatile liquid in the vaporizer, producing a pressure therein which will be communicated to the motor and generate power. The exhaust from the engine will pass to the condenser and be restored to its liquid state and then be returned to the vaporizer by the pump to be again utilized.

While owing to the cheapness of reservoirs and water and the high specific heat of the latter it is feasible to provide means for storing sufficient heat for several days' use, it may be desirable to provide against unusually prolonged cloudiness by an auxiliary device employing fuel. This may consist of a furnace 24, located in proximity to the reservoir, with flues 25 leading therethrough. It is obvious that any number of mirrors may be applied to heat a reservoir.

Having thus described my invention, I claim—

1. An apparatus of the class described comprising a concentrating device for the solar rays, a comparatively large reservoir removed from but connected by a pipe to said concentrating device and adapted to contain a liquid to be heated and store the heat therein, a comparatively small vaporizer under the influence of the heat of the liquid, and a motor to which the vapor from the vaporizer is delivered.

2. The combination with a concentrating device for the solar rays, of a reservoir removed from but connected by a pipe to said concentrating device and adapted to contain a liquid to be heated, a vaporizer located within the reservoir near the upper part thereof and surrounded by the liquid contained therein, and a motor to which the vapor from the vaporizer is delivered.

3. An apparatus of the class described comprising a concentrating device for the solar rays, a receptacle upon which the rays are concentrated, a reservoir removed from but connected with the receptacle, this connecting system being adapted to contain a liquid to be heated, a vaporizer located within said reservoir under the influence of the heat of the liquid, and a motor to which the vapor from the vaporizer is delivered.

4. The combination with a mirror, of a receptacle located at the focus of the mirror, a reservoir connected with the receptacle, this connecting system being adapted to contain a liquid to be heated, a vaporizer under the influence of the heat of the liquid, and a motor to which the vapor from the vaporizer is delivered.

5. An apparatus of the class described comprising a concentrating device for the solar rays, a receptacle upon which the rays are concentrated, a reservoir removed from but connected with the receptacle, this connecting system being adapted to contain a liquid to be heated, a vaporizer under the influence of the heat of the liquid, and a motor to which the vapor from the vaporizer is delivered, said motor being connected to the vaporizer to form a continuous circuit.

6. An apparatus of the class described comprising a concentrating device for the solar rays, a receptacle upon which the rays are concentrated, a reservoir removed from but connected with the receptacle, this connecting system being adapted to contain a liquid to be heated, a vaporizer under the influence of the heat of the liquid, a condenser connected with the motor and means for returning the products of condensation to the vaporizer.

7. The combination with a concentrating device for the solar rays, of a reservoir adapted to contain a liquid to be circulated therethrough by the heat from the concentrating device at a temperature less than its boiling-point, a vaporizer immersed in the liquid contained in said reservoir and adapted to contain and vaporize a fluid under the influence of the heat of the liquid in the circulating system, and a motor to which the vapor is delivered.

8. The combination with a concentrating device for the solar rays, of a reservoir adapted to contain a liquid to be heated and store the heat therein, a vaporizer located within said reservoir, and a motor to which the vapor from said vaporizer is delivered.

9. The combination with a concentrating device for the solar rays, of a comparatively large reservoir adapted to contain a liquid to be heated and store the heat therein, a comparatively small vaporizer located within said reservoir and under the influence of the heat of the liquid contained therein, and a motor to which the vapor from the vaporizer is delivered.

10. An apparatus of the class described comprising a concentrating device for the solar rays, a receptacle upon which the rays are concentrated, a reservoir removed from but connected with said receptacle, and adapted to contain a liquid to be heated and store the heat therein, a vaporizer located within said reservoir under the influence of the heat of said liquid, and a motor to which the vapor from the vaporizer is delivered.

Signed by me, at Boston, Massachusetts, this 16th day of April, 1902.

ERNEST C. KETCHUM.

Witnesses:
  WALTER E. LOMBARD,
  SYLVANUS H. COBB.